(12) United States Patent
Ross et al.

(10) Patent No.: US 6,499,375 B2
(45) Date of Patent: Dec. 31, 2002

(54) COMBINED DETENT AND INTERLOCK MECHANISM

(75) Inventors: Christopher B. Ross, Pinehurst, NC (US); Patrick L. Scheib, Pinehurst, NC (US); Kenneth T. Picone, Pinehurst, NC (US); Michael K. Humphrey, West End, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/851,710

(22) Filed: May 9, 2001

(65) Prior Publication Data

US 2002/0166401 A1 Nov. 14, 2002

(51) Int. Cl.⁷ .............................................. F16H 63/36
(52) U.S. Cl. .................................. 74/473.24; 74/473.25
(58) Field of Search ......................... 74/473.24, 473.25, 74/473.26

(56) References Cited

U.S. PATENT DOCUMENTS

| | | | | |
|---|---|---|---|---|
| 3,367,205 A | * | 2/1968 | Ratliff ..................... | 74/473.24 |
| 3,541,879 A | * | 11/1970 | Ravenel ................... | 74/473.26 |
| 3,602,060 A | * | 8/1971 | Magg ...................... | 74/473.24 |
| 4,892,001 A | * | 1/1990 | Meyers et al. ............. | 267/150 |

FOREIGN PATENT DOCUMENTS

JP    11-280901    * 10/1999

* cited by examiner

*Primary Examiner*—David Fenstermacher
(74) *Attorney, Agent, or Firm*—Carlson, Gaskey & Olds

(57) ABSTRACT

A manually controlled transmission includes a combined detent and interlock pin mechanism. The elongated interlock pin prevents surrounding shift fork extensions from being engaged when a desired shift fork extension is selected. A recess in the interlock pin allows engagement of a shift lever with a desired shift fork extension, and opposing sides of the interlock pin engage shift finger notches in the other shift fork extensions to prevent their movement. Detent springs attached to the manually controlled transmission substantially contact opposing ends of the sliding interlock pin to provide resistance as an end of the interlock pin substantially contacts the detent spring. An anti-rotate pin positioned proximate to the interlock pin prevents rotation, but not translation, of interlock pin.

22 Claims, 3 Drawing Sheets

COMBINED DETENT AND INTERLOCK MECHANISM

BACKGROUND OF THE INVENTION

The present invention relates generally to a combined detent and interlock mechanism for use with a manually controlled transmission.

As a vehicle operator moves a shift lever though a shift pattern, the shift lever moves and engages an operatively connected shift fork extension. The moving shift fork extension in turn selectively engages a shift fork, moving clutch collars into engagement with a desired gear, causing a gear shift.

When shifting gears in a manually controlled transmission, only one shift fork extension can be moved at a time. Prior art manually controlled transmissions utilize a ring shaped interlock mechanism to lock out other shift components and gears during a gear shift, preventing the engagement and movement of the shift components.

A detent mechanism is utilized to provide feedback, or a shift feel, to indicate to the vehicle operator where he is in the shift pattern. Detent mechanisms commonly coact with a contoured surface on the shift fork extension, providing resistance to the movement of the shift fork extensions.

One drawback to prior ring shaped interlock mechanisms is the complexity of their design and manufacture. The prior ring shaped interlock mechanisms are substantially "C-shaped" and contain an opening. The opening of the interlock tends to gap, weakening the interlock.

Hence, there is a need in the art for an improved combined detent and interlock mechanism for use with a manually controlled transmission.

SUMMARY OF THE INVENTION

The present invention relates to a combined detent and interlock mechanism for use with a manually controlled transmission.

The manual transmission of the present invention includes an elongated interlock pin. The interlock pin includes a recess sized and shaped to substantially receive the shift lever. The interlock pin is positioned in aligned shift finger notches of the shift fork extensions. During a shift to different shift fork extensions, the shift lever moves the recess of the interlock pin, aligning the recess with the shift finger notch of the desired shift fork extension. After alignment, the shift fork extension can move within the recess to engage a desired gear. The opposing sides of the interlock pin engage the shift finger notches of the other shift fork extensions to prevent movement of the other shift fork extensions.

Additionally, a pair of detent springs hang from the manually controlled transmission to substantially contact the opposing ends of the interlock pin. As the interlock pin slides during shifting to engage a different shift fork extension, one of the springs substantially contacts a side of the interlock pin, providing resistance.

The manually controlled transmission of the present invention also includes an anti-rotate pin. The anti-rotate pin substantially contacts a side surface of the interlock pin to prevent rotation of interlock pin, but allowing for translation.

Accordingly, the present invention provides a combined detent and interlock mechanism for use with a manually controlled transmission.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
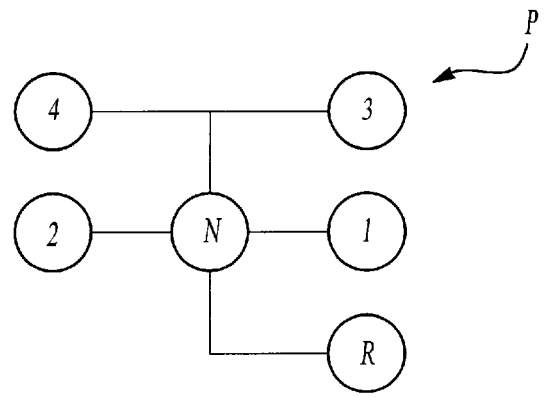
FIG. 1 illustrates a sectional side view of a manually controlled transmission of the present invention.
Figure 1:
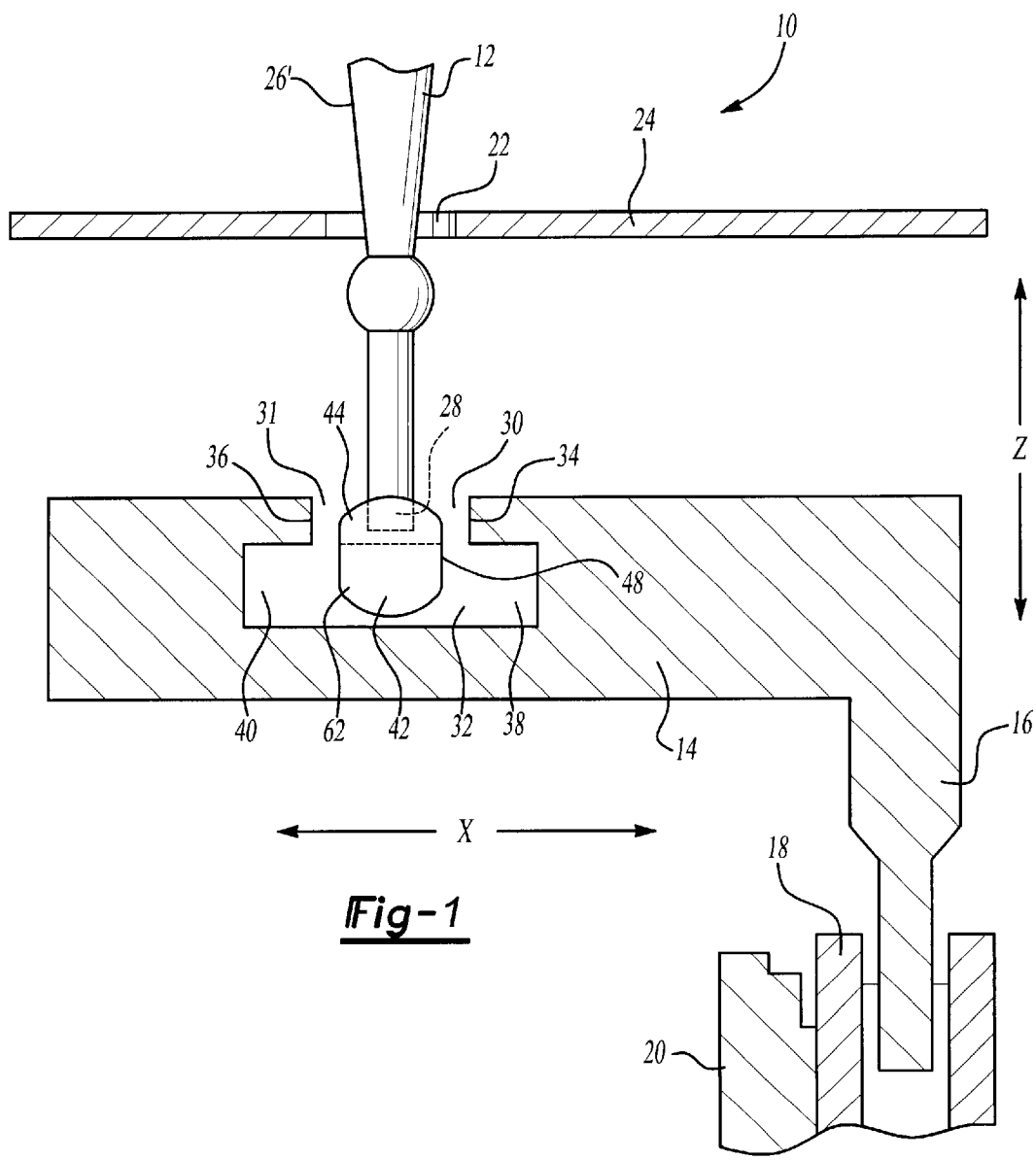

As shown in FIG. 1, the manually controlled transmission of the present invention 10 includes a shift lever 12 which engages and a plurality of axially moveable shift fork extensions 14, only one of which is shown. During a gear shift, the shift lever 12 operatively translates one of the shift fork extensions 14, each extension 14 carrying a perpendicularly attached shift fork 16 which engages and selectively moves a clutch collar 18 into engagement with a gear 20. The shift lever 12 extends through an aperture 22 in the top cover 24 of the manually controlled transmission 10, the top cover 24 supporting the transmission components and defining the shift pattern P.

The shift lever 12 includes a first portion 26 and an opposing second portion 28. When an operator moves the first portion 26 of the shift lever 12 in one direction, the second portion 28 of the shift lever 12 moves in the opposite direction. When a vehicle operator moves the shift lever 12 through the shift pattern P, the shift lever 12 operatively moves a shift fork 16 to cause a gear shift. In this embodiment, there are three shift forks 22 creating a reverse speed and four forward speeds.

The manually controlled transmission 10 shifts, or engages gears, by the axial movement of the selected shift fork extension 14 along the axis X. Each shift fork extension 14 has a notch 30. The notch 30 includes an upper portion 31, an underlying enlarged portion 32, a front protrusion 36 and a rear protrusion 34. The protrusions 34 and 36 are engageable by the second portion 28 of the shift lever 12 to translate the shift fork extension 14 along the X axis either in the forward or rearward direction. When the shift fork extensions 14 are all aligned in the neutral position, the notches 30 are also aligned. The enlarged portion 32 further includes a front hole 40 and a rear hole 38.

As the shift lever 12 is pivoted forwardly along the X axis, the second portion 28 of the shift lever 12 engages the rear protrusion 34 the notch 30 in the shift fork extension 14, translating the shift fork extension 14 rearwardly along axis X. Conversely, as the second portion 28 of the shift lever 12 is pivoted rearwardly, the second portion 28 of the shift lever 12 engages the front protrusion 36 of the notch 30, translating the shift fork extension forwardly along axis X. When the shift lever 12 is moved from side to side along axis Y, the second portion 28 of the shift lever 12 pivots and engages a different shift finger notch 30 of a different shift fork extension 14.

Figure 2:
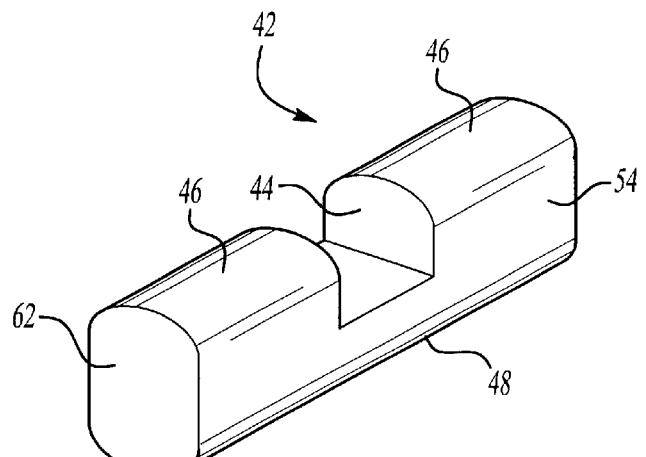
FIG. 2 illustrates a perspective view of the interlock pin of the present invention.

As illustrated in FIG. 2, the manually controlled transmission 10 of the present invention further includes an elongated interlock pin 42. The interlock pin 42 includes a recess 44 located substantially in the center of the interlock pin 42 between opposing sides 46. An intermediate portion 48 is located below the recess 44, the recess 44 being sized and shaped to substantially receive the second portion 28 of the shift lever 12.

Figure 3:
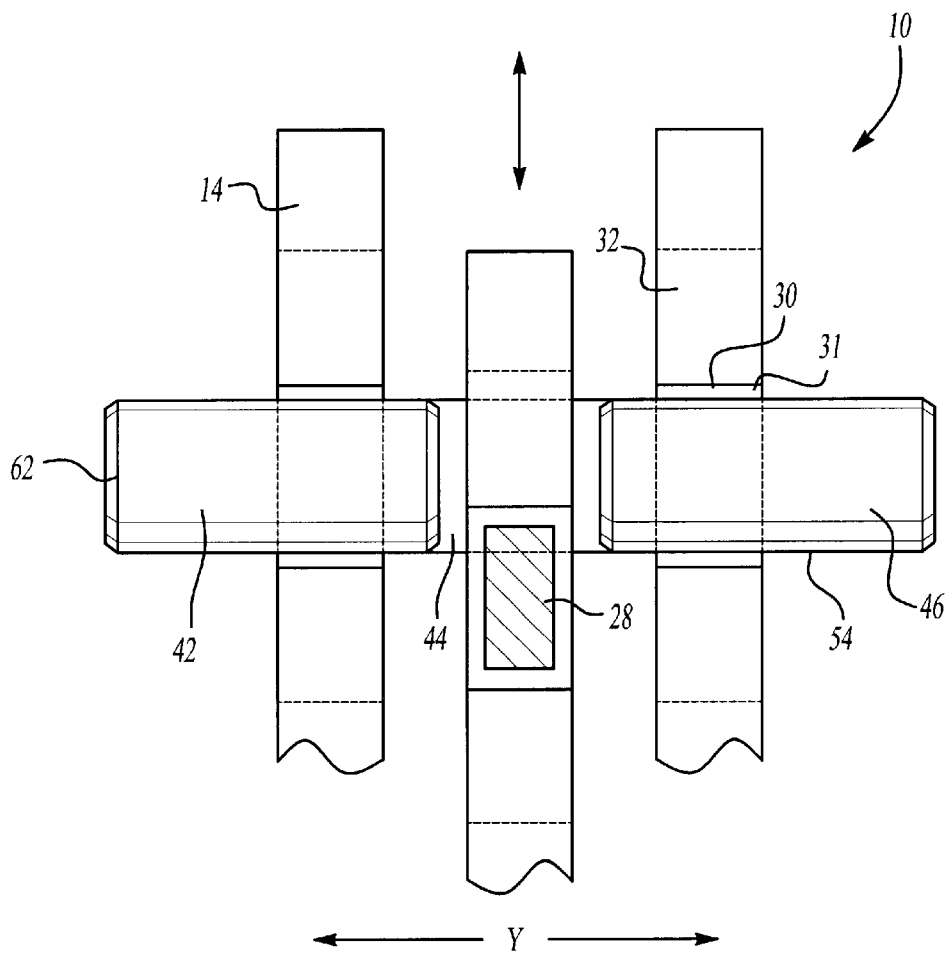
FIG. 3 illustrates a top view of a shift lever engaging the interlock pin and a plurality of shift fork extensions.

When the manually controlled transmission 10 is in neutral, the notches 30 are all substantially aligned, and the interlock pin 42 is positioned in the aligned notches 30. As illustrated in FIG. 3, the shift lever 12 can also be moved along the Y axis to engage a desired shift finger extension 14. The interlock pin 42 slides with the second portion 28 of the shift lever 12, aligning the recess 44 of the interlock 42 with the notch 30 of the selected shift fork extension 14.

Returning to FIG. 1, the shift lever 12 can move along the X axis such that that the second portion 28 of the shift lever 12 substantially engages either the front protrusion 36 or the rear protrusion 34 of the notch 30. As the shift lever 12 translates the shift fork extension 14 in the forward direction along the X axis, the rear protrusion 34 slides over the recess 44, the intermediate portion 48 entering the rear hole 38. As the shift lever 12 translates the shift fork extension 14 in the rearward direction along the X axis, the front protrusion 36 slides over the recess 44, the intermediate portion 48 entering the front hole 40. Therefore, as the selected shift fork extension 14 slides forwardly or rearwardly along the X axis, the interlock pin 42 does not hinder the movement of the selected shift fork extensions 14. Additionally, as the shift fork extension 14 slides, the opposing sides 46 of the interlock pin 42 engage the notches 30 of the other selected shift fork extensions 14, preventing their movement.

Figure 4:
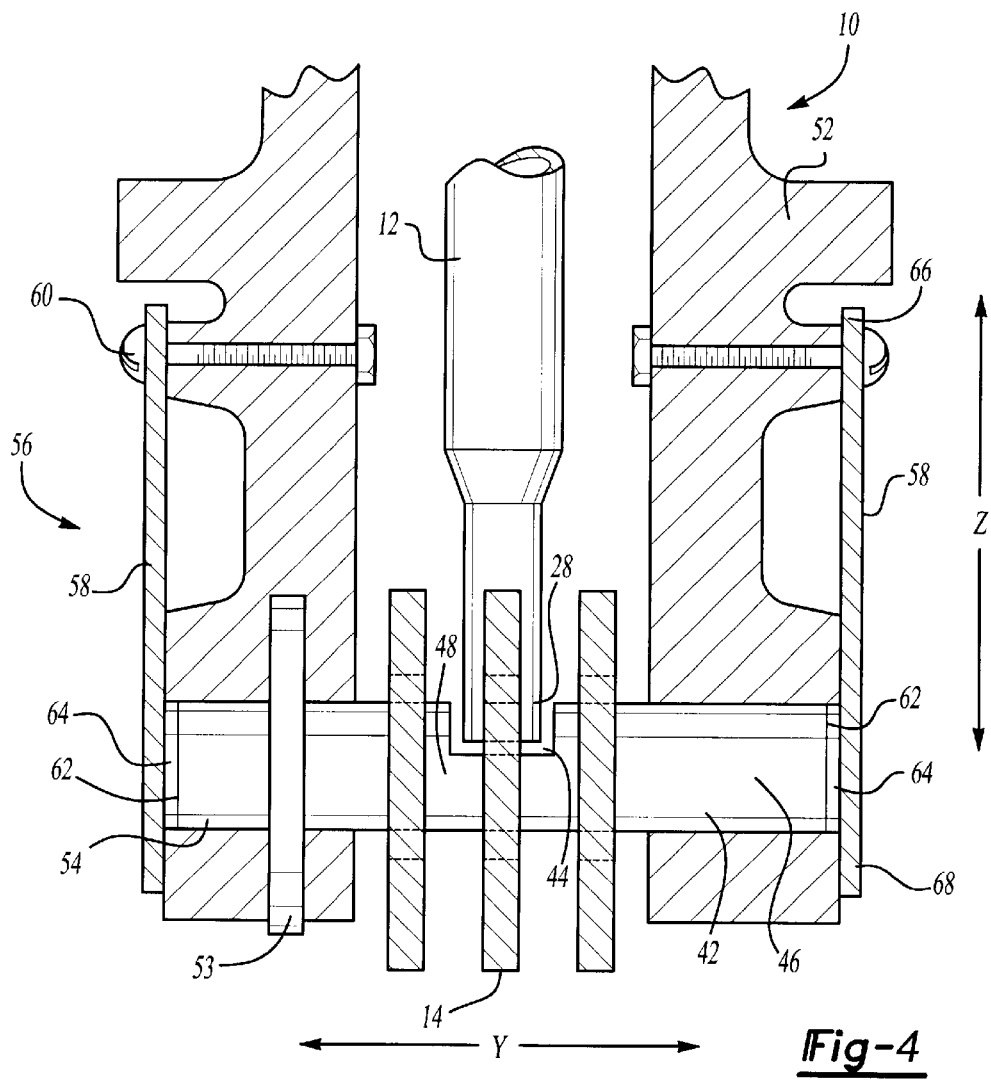
FIG. 4 illustrates a cross sectional front view of the shift lever engaging the interlock pin and the plurality of shift fork extensions.
Figure 5:
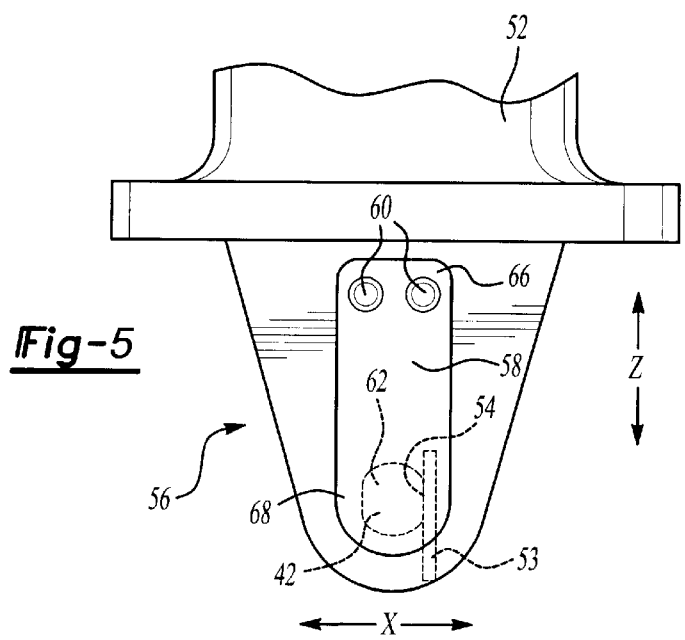
FIG. 5 illustrates a side view of a manually controlled transmission utilizing the interlock pin of the present invention.

The present invention further includes a detent mechanism 56 which provides resistance, or a shift feel, to the manually controlled transmission 10, as illustrated in FIGS. 4 and 5. The detent mechanism 56 includes a pair of substantially rectangular detent springs 58 attached to a housing 52 of the manually controlled transmission 10. The housing 52 includes a pair of apertures 64, each being located on an opposing side of the housing 52. The apertures 64 are substantially sized, shaped and located to receive the opposing ends 62 of the interlock pin 42 so that the sides 46 of the interlock pin 42 can slide through the pair of apertures 64.

The top portion 66 of each detent spring 58 is attached to one side of the housing 52 and the bottom portion 68 is unattached. In the preferred embodiment, the top portion 66 is secured to the housing 52 by a pair of rivets 60. However, other methods of attachment are possible.

A detent spring 58 is positioned on each side of the housing 52 so that each spring 58 substantially overlays one of the apertures 64. When the interlock pin 42 is slid along the Y axis to select a different shift fork extension 14, one end 62 of the interlock pin 42 enters one of the apertures 64. As the interlock pin 42 passes through the apertures 64, the end 62 of the interlock pin 42 engages one of the detent springs 58, pushing the spring 58 outwardly. As the top portion 66 of the spring 58 is attached to the housing and the bottom portion 68 is unattached, the bottom portion 68 lifts outwardly from the housing 52. The bottom portion 68 pushes against the end 62 of the interlock in 42, creating resistance in the shift lever 12.

As also illustrated in FIGS. 4 and 5, the manually controlled transmission 10 of the present invention further includes an anti-rotate pin 53. The anti-rotate pin 53 which substantially contacts a side wall 54 of the interlock pin 42, preventing rotation of interlock pin 42, but allowing for translation or the interlock pin 42 along the y axis.

There are several advantages to utilizing the manual shift interlock assembly 42 of the present invention. For one, the interlock pin 42 is of a simpler design than the commonly utilized ring shaped interlock, making design and manufacture easier. As the interlock pin 42 is not substantially "C-shaped," the interlock pin can be made stronger.

Additionally, the detent springs 58 provide for built in shift stops. Finally, as a pair of detent springs 58 are utilized, each detent spring 58 can be of different size and shape to provide different forces on the ends 62 of the interlock pin 42.

Accordingly, the present invention provides a combined detent and interlock mechanism for use with a manually controlled transmission.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A combined interlock and detent mechanism for use with a manually controlled transmission comprising:

an interlock having a recess positioned between opposing ends, said interlock being slidable from a central position by a shift lever being received within said recess; and a detent mechanism positioned proximate to each of said opposing ends of said interlock to provide resistance hi said manually controlled transmission when said interlock is slid from said central position, and said detent mechanism contacts one of said opposing ends of said interlock when said interlock is slid from said central position.

2. The combined interlock and detent mechanism as recited in claim 1 wherein said detent mechanism includes a pair of detent springs, each of said detent springs being positioned to substantially overlay one of said ends of said interlock.

3. The combined interlock and detent mechanism as recited in claim 2 wherein the movement of said interlock from said central position provides resistance in said manually controlled transmission.

4. The combined interlock and detent mechanism as recited in claim 2 wherein said pair of detent springs are flat.

5. The combined interlock and detent mechanism as recited in claim 2 wherein said pair of detent spring are substantially rectangular.

6. The combined interlock and detent mechanism as recited in claim 1 wherein said detent mechanism only contacts said interlock when said interlock is slide from said central position.

7. A manually controlled transmission comprising:
a shift lever to operatively move a plurality of axially moveable parallel shift fork extensions;
an interlock having a recess positioned between opposing ends, said interlock being slidable from a central position by said shift lever being received within said recess;
a detent mechanism positioned proximate to each of said opposing ends of said interlock to provide resistance in said manually controlled transmission when said interlock is slid from said central position, and said detent mechanism contacts one of said opposing ends of said interlock when said interlock is slid from said central position;
said plurality of axially moveable parallel shift fork extensions each including a notch, said notch of a selected shift fork extensions being aligned with said recess of said interlock when selected;
a plurality of shift forks, said shift forks corresponding to and engaging said plurality of shift fork extensions; and
a plurality of gears operatively connected to said plurality of shift forks.

8. The manually controlled transmission as recited in claim 7 wherein said detent mechanism only contacts said interlock when said interlock is slide from said central position.

9. A manually controlled transmission comprising:
a shift lever to operatively move a plurality of axially moveable parallel shift fork extensions;
an interlock having a recess positioned between opposing ends, said interlock being slidable from a central position by said shift lever being received within said recess;
a detent mechanism positioned proximate to each of said opposing ends of said interlock to provide resistance in said manually controlled transmission when said interlock is slid from said central position;
said plurality of axially moveable parallel shift fork extensions each including a notch, said notch of a selected shift fork extensions being aligned with said recess of said interlock when selected;
a plurality of shift forks, said shift forks corresponding to and engaging said plurality of shift fork extensions; and
a plurality of gears operatively connected to said plurality of shift forks.

10. The manually controlled transmission as recited in claim 9 wherein said detent mechanism includes a pair of detent springs, each of said detent springs being positioned to substantially overlay one of said ends of said interlock.

11. The manually controlled transmission as recited in claim 10 wherein a top portion of each of said detent springs is attached to said manually controlled transmission and a bottom portion of each of said detent springs is unattached to said manually controlled transmission, each of said bottom portions substantially overlaying one of said ends of said interlock.

12. The manually controlled transmission as recited in claim 11 wherein said top portion of each of said detent springs is attached to said manually controlled transmission by a pair of rivets.

13. The manually controlled transmission as recited in claim 11 wherein one of said ends of said interlock substantially contacts and pushes outwardly said bottom portion of said detent spring as said interlock moves from said central position, providing resistance in said manually controlled transmission.

14. The manually controlled transmission as recited in claim 9 wherein said pair of detent springs are flat.

15. The manually controlled transmission as recited in claim 9 wherein a pin positioned proximate to said interlock prevents rotation of said interlock during operation of said manually controlled transmission.

16. The manually controlled transmission as recited in claim 9 wherein said interlock fits in said notch of said at least one shift fork extension.

17. The manually controlled transmission as recited in claim 9 wherein said pair of detent spring are substantially rectangular.

18. A manually controlled transmission comprising:
a shift lever to operatively move a plurality of axially moveable parallel shift fork extensions;
an interlock having a recess positioned between opposing ends, said interlock being slidable from a central position by said shift lever being received within said recess;
a detent mechanism positioned proximate to each of said opposing ends of said interlock to provide resistance in said manually controlled transmission when said interlock is slid from said central position, said detent mechanism including a pair of detent springs, each of said detent springs being positioned to substantially overlay one of said ends of said interlock, and a top portion of each of said detent springs is attached to said manually controlled transmission and a bottom portion of each of said detent springs is unattached to said manually controlled transmission, each of said bottom portions substantially overlaying one of said ends of said interlock;
said plurality of axially moveable parallel shift fork extensions each including a notch, said notch of a selected shift fork extensions being aligned with said recess of said interlock when selected;
a plurality of shift forks, said shift forks corresponding to and engaging said plurality of shift fork extensions; and
a plurality of gears operatively connected to said plurality of shift fork.

19. A combined interlock and detent mechanism for use with a manually controlled transmission comprising:
an interlock having a recess positioned between opposing ends, said interlock being slidable from a central position by a shift lever being received within said recess; and
a detent mechanism including a pair of detent springs and positioned proximate to each of said opposing ends of said interlock to provide resistance in said manually controlled transmission when said interlock is slid from said central position, each of said detent springs being positioned to substantially overlay one of said ends of said interlock, and a top portion of each of said detent springs is attached to said manually controlled transmission and a bottom portion of each of said detent springs is unattached to said manually controlled transmission, each of said bottom portions substantially overlaying one of said ends of said interlock.

20. The combined interlock and detent mechanism as recited in claim 19 wherein said top portion of each of said detent springs is attached to said manually controlled transmission by a pair of rivets.

21. The combined interlock and detent mechanism as recited in claim 19 wherein one of said ends of said interlock substantially contacts and pushes outwardly said bottom portion of said detent spring as said interlock moves from said central position, providing resistance in said manually controlled transmission.

22. The combined interlock and detent mechanism as recited in claim 1 wherein a pin positioned proximate to said interlock prevents rotation of said interlock during operation of said manually controlled transmission.

* * * * *

UNITED STATES PATENT AND TRADEMARK OFFICE
CERTIFICATE OF CORRECTION

PATENT NO. : 6,499,375 B2
DATED : December 31, 2002
INVENTOR(S) : Ross et al.

It is certified that error appears in the above-identified patent and that said Letters Patent is hereby corrected as shown below:

Column 4,
Line 44, "hi" should be -- in --.

Signed and Sealed this

Twenty-fifth Day of March, 2003

JAMES E. ROGAN
*Director of the United States Patent and Trademark Office*